United States Patent [19]
Leheny et al.

[11] 3,761,837
[45] Sept. 25, 1973

[54] LASERS IN INDIRECT-BANDGAP SEMICONDUCTIVE CRYSTALS DOPED WITH ISOELECTRONIC TRAPS

[75] Inventors: Robert Francis Leheny, Little Silver; Ralph Andre Logan, Morristown; Robert Edward Nahory, Lincroft; Kerry Lee Shaklee, Sea Bright, all of N.J.

[73] Assignee: Bell Telephone Laboratories, Incorporated, Murray Hill, Berkeley Heights, N.J.

[22] Filed: Oct. 8, 1971

[21] Appl. No.: 187,631

[52] U.S. Cl. .......................... 331/945 H, 317/235 R
[51] Int. Cl. .............................................. H01s 3/00
[58] Field of Search .............................. 331/94.5 H; 317/235 N

[56] References Cited
UNITED STATES PATENTS
3,059,117 10/1962 Boyle et al. .................. 331/94.5
3,592,704 7/1971 Logan et al. .................. 317/235

*Primary Examiner*—Edward S. Bauer
*Attorney*—W. L. Keefauver

[57] ABSTRACT

There are disclosed lasers in indirect-bandgap semiconductive crystals, such as gallium phosphide crystals containing isoelectronic traps such as those provided by nitrogen or bismuth, in which low-threshold, high-gain stimulated emission of coherent radiation is obtained. It was previously believed that stimulated emission in indirect-bandgap materials was unlikely. In contrast to similarly-composed electroluminescent devices, such a laser typically has an optical resonator provided along the junction plane. An experimental embodiment is a superradiant laser that is optically pumped by coherent light along a line extending to an edge of the crystal.

1 Claim, 2 Drawing Figures

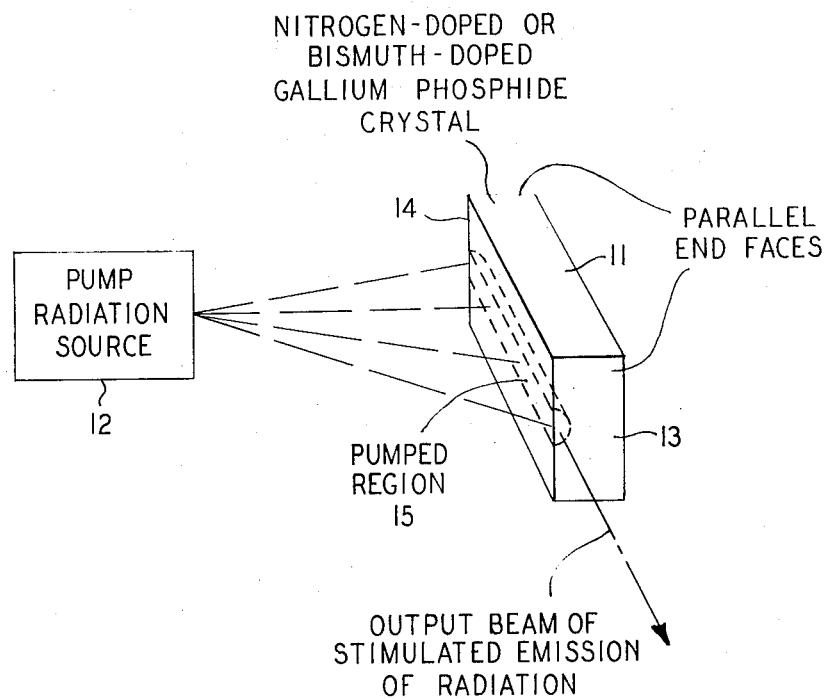
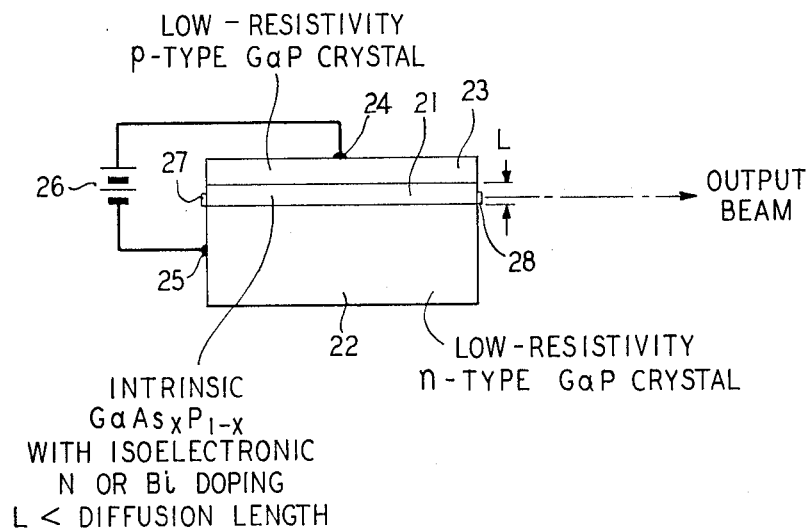

LASERS IN INDIRECT-BANDGAP SEMICONDUCTIVE CRYSTALS DOPED WITH ISOELECTRONIC TRAPS

BACKGROUND OF THE INVENTION

This invention relates to lasers in semiconductive crystals, particularly in semiconductive crystals having indirect bandgaps.

The success achieved in experimental development of the gallium arsenide laser, which operates in the near infrared portion of the optical spectrum, has lead to the suggestion and investigation of a wide variety of other semiconductive materials for lasers in order to obtain similar results at other frequencies, or even improved results. These investigations have been mainly confined to semiconductors that have direct bandgaps. The bandgap is a direct bandgap when a plot of the energy-momentum relationships for charge carriers in the valence band and the conduction band of the material show the lowest minimum of the conduction band directly above the maximum of the valence band. In contrast, the bandgap is indirect when the lowest minimum, or valley, of the conduction band occurs at a substantial value of charge carrier momentum, that is a momentum differing substantially from that of the valence band maximum.

The problem with obtaining stimulated emission of radiation in an indirect-bandgap semiconductive material is that a charge carrier excited to the conduction band minimum has a low likelihood of a radiative transition back to the valence band because it has no convenient way of losing the necessary momentum while simultaneously giving up the required quantum of energy.

SUMMARY OF THE INVENTION

We have discovered that the presence of isoelectronic traps in indirect-bandgap semiconductive crystals, such as gallium phosphide crystals, so substantially increase the likelihood of the radiative transitions to the valence band, that the stimulated emission of radiation is readily achieved along an axis of a relatively elongated pumping or excitation region in the crystal. While such crystals containing such isoelectronic traps have previously been employed in electroluminescent devices, the manner of their prior use has apparently concealed the possibility of the stimulated emission of radiation.

It is one aspect of our invention that, instead of extracting the light emission of the crystal through a broad major surface as is done in the electroluminescent devices, we extract the radiation along an axis of a relatively elongated excitation region in the crystal, which axis is typically parallel to the major surface. Thus, the radiation is extracted through a minor face of the crystal.

According to another aspect of our invention, the stimulated emission of coherent radiation had been obtained in an indirect-bandgap semiconductive crystal, such as a gallium phosphide crystal, including nitrogen or bismuth atoms that do not contribute to the charge carrier concentration but apparently provide or facilitate radiative recombination of free charge carriers to enable low-threshold, high-gain stimulated eemission of coherent radiation.

In two specific experimental embodiments of our invention, superradiant emission of visible light has been obtained in gallium phosphide crystals optically pumped by an ultraviolet laser along a line extending to an edge of the crystal. Green light has been obtained with nitrogen isoelectronic traps in the gallium phosphide crystals and yellow light has been obtained with bismuth isoelectronic traps in the crystal. In the case of the nitrogen-containing crystals, optical gain has been measured at temperatures from 2 degrees to 200 degrees Kelvin. The gain occurs between 5,400 and 5,700 Angstrom units at 2 degrees Kelvin and is as high as $10^4$ cm$^{-1}$.

BRIEF DESCRIPTION OF THE DRAWING

Further features and advantages of our invention will become apparent from the following detailed description, taken together with the drawing, in which:

FIG. 1 is a partially pictorial and partially block diagrammatic illustration of an experimental embodiment of our invention; and FIG. 2 is a partially pictorial and partially schematic illustration of an injection laser embodiment of our invention.

DESCRIPTION OF THE ILLUSTRATIVE EMBODIMENT

In the experimental embodiment of FIG. 1, various different gallium phosphide crystals 11 were optically pumped by a pump radiation source 12 such as a pulsed nitrogen laser. The output of the source 12 was focused into an elongated pumped region 15 which extended to at least one end surface 13 of crystal 11, preferably orthogonal to surface 13.

Advantageously, the opposite face of crystal 14 is parallel to crystal 13, so that if the pumped region 15 is extended therebetween, orthogonal to both surfaces 13 and 14, they will tend to form an optical resonator for the stimulated emission of radiation.

The surface illuminated by the pump source 12 to pump region 15 was an as-grown face of crystal 11.

Various ones of the crystals 11 include significant amounts of nitrogen or bismuth that did not contribute to free carrier concentration in the crystal, as will be more fully explained hereinafter.

A surprising aspect of our present discovery is that our observations were made in crystals that had been previously grown during development work for gallium phosphide electroluminescent devices. Nevertheless, such crystals did not typically have adequately finished parallel interfaces orthogonal to an axis extending along the longest dimension of a major surface of crystal 11, nor were they ever pumped, as by pump radiation source 12, along that axis extending between surfaces 13 and 14 to establish a population inversion and enable the stimulated emission of radiation in a pumped region 15. We have found that it is adequate to direct the pumping radiation from source 12 upon an as-grown face which is a major surface of the crystal 11.

In making our discovery we employed as pump radiation source 12 a pulsed nitrogen laser, which operates at a wavelength of about 3,370 Angstrom units. It is an inherent characteristic of such a laser that its output beam has an essentially rectangular cross section and that it can be focused by a cylindrical lens within source 12 in order to completely illuminate the pumped region 15 between parallel end surfaces 13 and 14.

Further, in some of our earliest experiments, the pumped region 15 only extended to one end of the crystal as, for example, at surface 13; and the length of the pumping line was varied in making our observations. This experimental technique is disclosed and claimed in the copending patent application of two of us, R. F. Leheny and K. L. Shaklee, Ser. No. 112,237, filed Feb. 3, 1971, and assigned to the assignee hereof. Net optical gain and the presence of stimulated emission are verified when the output radiation intensity varies exponentially in magnitude for equal increments of variation of the length of the pumped region 15.

The following details may be helpful in appreciating our experimental discovery of the first known stimulated emission of radiation in an indirect-bandgap material. The crystal 11 was a lightly-doped vapor-phase-grown material without any p-n junction. It had a nitrogen concentration of approximately $5 \times 10^{16}$ per cubic centimeter; but similar observations were obtained for a wide range, up to $10^{19}$ per cubic centimeter, of nitrogen concentrations and from crystals grown by different techniques, including growth from gallium solution and vapor-phase and liquid-phase epitaxy.

It should be noted that nitrogen as an impurity in the crystal 11 is isoelectronic with respect to the phosphorus and thus does not act as a donor or an acceptor. It does, however, apparently act as a trap for excited charge carriers and provides, apparently, a means for absorbing momentum as is necessary for efficient radiative recombination of charge carriers to take place in the indirect-bandgap crystal. In the operation of the embodiment of FIG. 1, in addition to the observation of the exponential variation of light output, as described above, we have observed that the radiative lifetime is much shorter than previously measured spontaneous radiative lifetimes in similar gallium phosphide crystals. This observation is consistent with our proposed explanation of our observations, namely, that the stimulated emission of radiation is occurring.

It is merely necessary to extend the length of the pumped region 15 to obtain a superradiant output beam of the stimulated emission of radiation. Further, oscillations should be obtainable with slight improvement of the resonator provided by end surfaces 13 and 14. This prediction is based upon the observed low threshold for the superradiant emission.

Similar observations have been made for crystals 11 which included bismuth as an impurity. The bismuth is also isoelectronic with phosphorus and does not act as a donor or acceptor but, rather, apparently as a trap and effective recombination center. While the light emission with nitrogen as an impurity is in the green portion of the spectrum, a bright yellow emission is obtained when bismuth is the impurity. Further, in one crystal in which nitrogen and bismuth impurities occurred in varying proportions across the crystal, shifting the pump region 15 gave a varying mixture of the green and yellow light emissions.

While we do not wish to be bound by the following theory, we believe that nitrogen and bismuth impurities in gallium phosphide crystals 11 and that, indeed, selected isoelectronic dopants in any indirect-bandgap crystal, enable the stimulated emission of coherent radiation for the following reasons. Recombination for charge carriers between a valence band with a vertex at zero momentum, as described by an energy-momentum diagram, and a lowest-energy conduction band having its vertex at a substantial nonzero value of momentum, is normally highly improbable because the recombining charge carriers have no opportunity to lose an undesired component of relative momentum. The deep isoelectronic traps provide that possibility because, on the energy momentum diagram their characteristic extends horizontally through all values of momentum. In other words, such a trap is capable of absorbing the above-mentioned momentum difference. Our experiments appear to verify that the charge carriers, electrons and holes tend to recombine at the sites of the isoelectronic impurities.

We have observed an apparent departure from exponential variation of the light output at the longest excitation lengths of the pumped region 15 and in a range of relatively high pumping intensities. We attribute this departure to saturation effects. Nevertheless, we do not wish to be bound by the foregoing theory.

We have observed a maximum gain for a crystall 11 including a nitrogen impurity of about 3,500 cm$^{-1}$ at an output radiation wavelength of 5,375 Angstrom units, with a supplied pump intensity to the pumped region 15 of approximately $10^6$ watts per square centimeter. At the maximum available pump intensity of $2 \times 10^7$ watts per square centimeter, optical gains in excess of $10^4$ cm$^{-1}$ were observed.

The gain spectrum shows two distinct features, a large peak near the photon energy 2.30 electron volts and a low energy tail extending below 2.20 eV. The onset of the large gain peak occurs just below the energy of the nitrogen A-line in lightly doped materials. This peak is pushed to lower energies as the nitrogen concentration is increased.

With increasing temperature, the gain was found to decrease in magnitude; but the gain was still present even at room temperature. In fact, the unsaturated gain varies from about $10^4$ cm$^{-1}$ at 2 degrees Kelvin to about 200 cm$^{-1}$ at 300 degrees Kelvin. At room temperature, the emission intensity varies exponentially with excitation length over a large range before saturation takes place at lengths close to one-half millimeter. This result is, of course, to be expected since at such low values of gain, saturation cannot be achieved so readily as with the high gains measured at low temperatures. The crucial parameter in attaining saturation is gain times length of excitation.

The mechanism involved in producing the observed stimulated emission is evidently dependent upon the presence of nitrogen. The reasons for this are two-fold. First, note that the gain spectrum spans the wavelength range between the nitrogen A-line and the longest-wavelength NN pair line. Second, measurements have been made in samples with various nitrogen densities. In a pure sample of GaP with negligible nitrogen, no emission at all was seen. For the experminetal embodiment of FIG. 1, the nitrogen concentration was moderate, N $\sim 10^{16}$ to $10^{17}$ cm$^{-3}$. At very high nitrogen concentrations, N $\sim 10^{19}$ cm$^{-3}$, the measured gain spectrum is similar to that in FIG. 1 except that the high energy end is cut off. This might be expected since A-line absorption is large for these samples, and also since at such high concentrations the bound excitons tend to hop to lower-energy NN lines. Thus, nitrogen evidently plays an important role in producing the observed stimulated emission. This is reasonable since the extent throughout K-space of isoelectronic wave functions could make essentially direct transitions possible in the indirect GaP. To further test this idea we have measured the emission from GaP doped with bismuth (Bi), which is another known isoelectronic trap. These samples exhibit gain in the yellow from 5,550 A to beyond 6,000 A, i.e., between the known Bi A-line and the longest wavelength Bi emission. This result reinforces the above conclusions concerning nitrogen and demonstrates the importance of isoelectronic traps in the observed stimulated emission processes.

An important consideration in speculations concerning indirect-bandgap semiconductors as possible laser materials is the relatively long intrinsic lifetimes which allow generation of large carrier populations in the conduction and valence bands. However, the matrix elements for radiative transitions across the indirect gap are small, and nonradiative processes limit the free-carrier population. In the present work in GaP, we have circumvented this problem through introduction of isoelectronic traps which dominate the recombination processes, apparently by providing zone-center coupling for efficient radiative transitions. The coupling between nitrogen traps and conduction band states is strong in GaP. Evidence for this is found in absorption measurements which slow large nitrogen-induced absorption matrix elements above the energy of the A-line and the indirect gap. The nitrogen-induced absorption is in fact ~10 times greater than the intrinsic absorption in the neighborhood of the indirect gap. Further, in measurements of excitation spectra it is seen that free carriers decay efficiently through nitrogen centers, emitting radiation in the process with an energy characteristic of the nitrogen centers. Thus, with the high densities of carriers possible in the indirect conduction band, and strong coupling of these carriers to nitrogen centers to give efficient radiative recombination, we have all the ingredients for this first observation of stimulated emission in an indirect-bandgap semiconductor.

In the injection laser embodiment of FIG. 2, the intrinsic crystal portion 21 is similar to crystal 11 of FIG. 1. On opposite major surfaces thereof are grown the low-resistivity p-type gallium phosphide crystal portion 23 and the low-resistivity n-type gallium phosphide crystal portion 22 by any of the available techniques that will make the portions 21, 22 and 23 single crystal. The direct current source 26 is connected between the large area ohmic contact 24 to portion 23 and the ohmic contact 25 to portion 22 in order to inject pumping current through the gallium phosphide device so that radiative recombination occurs in the intrinsic region 21, presumably at isoelectronic traps. A population inversion is thereby achievable in the crystal 21 and the stimulated emission of coherent radiation can be obtained, either in response to an input light beam of wavelength matching that of the expected emission, or by provision of a suitable optical resonator including reflectors 27 and 28 deposited on opposite parallel end surfaces of the intrinsic crystal 21.

By analogy to the operation of the embodiment of FIG. 1, it should be apparent that green coherent emission of radiation will be obtained when intrinsic crystal 21 includes nitrogen as an impurity and that yellow coherent emission of radiation will be obtained when crystal 21 includes bismuth as an isoelectronic impurity. Neither the nitrogen nor the bismuth significantly affect the substantially intrinsic nature of the crystal 21.

It should be noted that the low-resistivity portions 22 and 23 enable the efficient injection of current into the device so that the recombining charge carriers can effectively drift through the intrinsic region 21. It is proposed that the thickness of the region 21 be no greater than about one-half micrometer.

We claim:
1. A laser comprising a crystal of an indirect-bandgap semiconductive material consisting essentially of gallium phosphide, said crystal having a significant content of an impurity that is isoelectronic with respect to a principal constituent of said material, said impurity being selected from the group consisting of nitrogen and bismuth, and
   means for obtaining the stimulated emission of radiation from said crystal including
   means for optically pumping a major surface of said crystal throughout an elongated region extending to at least one end surface of said crystal, which end surface is essentially orthogonal to said major surface, to enable the stimulated emission of radiation of a photon energy directly related to the energy separation from the valence band of the characteristic energy of said isoelectronic impurity.

* * * * *